United States Patent [19]

Miserlis et al.

[11] 4,068,053
[45] Jan. 10, 1978

[54] METHOD OF REMOVING WATER FROM LIQUID OLEFIN IN THE POLYMERIZATION OF OLEFINS

[75] Inventors: Constantine D. Miserlis, Arlington; Peter J. Lewis, Andover, both of Mass.

[73] Assignee: The Badger Company, Inc., Cambridge, Mass.

[21] Appl. No.: 728,154

[22] Filed: Sept. 30, 1976

[51] Int. Cl.$^2$ .......................... C08F 6/04; C08F 6/10; C08F 10/06
[52] U.S. Cl. .................................. 526/68; 526/77
[58] Field of Search ...................... 526/68, 77

[56] References Cited

U.S. PATENT DOCUMENTS

| | | | |
|---|---|---|---|
| 2,742,454 | 4/1956 | Rearick et al. | 526/68 |
| 2,813,089 | 11/1957 | Twaddle et al. | 526/77 |
| 3,109,837 | 11/1963 | Lockheed et al. | 526/77 |
| 3,255,171 | 6/1966 | Eilbracht et al. | 526/77 |
| 3,296,241 | 1/1967 | Berger | 526/77 |

FOREIGN PATENT DOCUMENTS

| | | | |
|---|---|---|---|
| 848,927 | 9/1960 | United Kingdom | 526/77 |

Primary Examiner—Alan Holler
Attorney, Agent, or Firm—Sewall P. Bronstein

[57] ABSTRACT

Removing water and light ends from recycle liquid olefin monomer and fresh liquid olefin monomer feed before catalytic polymerization thereof in said liquid state with a water sensitive catalyst, by flowing them through a mass transfer plate tower with a reboiler which vaporizes them upwardly through openings in the plates of said tower and in the form of bubbles through layers of liquid monomer reflux maintained on said plates by weirs and downcomers by means of which said reflux is flowed from each plate downwardly to the plate below it and, as a layer, along the top of the plate and thence downwardly to the next lower plate, condensing in a reflux condenser the vapor from the top of said tower, removing from said condenser as a vapor said light ends, removing water from said condenser as a heavy condensed liquid fraction and refluxing back to the top of said tower as a lighter liquid fraction, condensed liquid monomer. Preferably the tower is a valve tray tower and the plates are valve trays.

5 Claims, 2 Drawing Figures

METHOD OF REMOVING WATER FROM LIQUID OLEFIN IN THE POLYMERIZATION OF OLEFINS

THE PROBLEM

In the catalytic liquid phase polymerization under positive pressure of olefins to polyolefins, such as polyethylene, polypropylene, polybutylene, etc., the reaction mass comprises polyolefin dissolved in liquid monomer. The monomer is separated from the dissolved polymer by flashing and the flashed monomer vapor is liquified and recycled back to the reactor together with fresh liquid olefin monomer feed. The catalyst conventionally used in this process, e.g. Ziegler catalyst, is highly sensitive to even minute amounts of water. Accordingly, water must be removed from the recycle and fresh feed before the catalyst is introduced in the reactor. This has been achieved in the past in two stages. In the first stage, the liquid recycle and fresh feed are passed through a stripping tower in which water and light ends are stripped off and they are then passed through a molecular sieve dryer where the remaining water is removed.

In view of the nature of the liquid recycle and fresh monomer feed, and the theoretical difficulty in separating very small amounts of water from the monomer, the stripping tower utilized has been a packed tower packed with a high efficiency packing.

These packed towers have presented the following serious problems. After operation for a relatively short time, pressure drop across the tower commences to increase and continues to do so with consequent flooding problems until the system becomes fouled thereby requiring frequent shut downs and replacement of the relatively expensive packing with fresh packing at substantially increased cost and decrease in production. Further, during a large part of the operating time between replacements of packing, the pressure drop is relatively high thereby requiring increased power at increased cost.

It is believed that these problems are due to the peculiar and unpredictable nature of the liquid olefin recycle and fresh feed and is unique to this system, in which the recycle monomer contains small amounts of polyolefin which evidently come up in the tower with the vapor, probably by entrainment, and fall out on the adhere to the packing surface as a sticky mass thereby increasing pressure drop and eventually fouling the packing. It is believed that this polymer comes off with the monomer vapor flash during flashing.

BRIEF DESCRIPTION OF THE INVENTION

In accordance with the present invention the aforesaid problems are eliminated by passing the liquid recycle and fresh feed monomer through a mass transfer plate tower, such as a valve tray or sieve tray or bubble cap tray tower, with conventional reboiler and conventional reflux condenser with decanter. The liquid monomer is vaporized in the tower by the reboiler and the vapor flows upwardly through the openings in the plates and, as bubbles, through the layers of liquid monomer reflux maintained on the plates by the weirs and downcomers by means of which the liquid monomer reflux flows downwardly from each tray to the tray below it, along the top of the latter tray as a liquid layer and thence to the next lower tray. Light ends are removed from the condenser as a vapor. The lighter condensed decanted liquid monomer fraction is refluxed back to the top of the tower and water is removed from the condenser as a heavier condensed decanter fraction.

Surprisingly enough with the use of mass transfer plates in accordance with the invention, pressure drop does not increase after operation has commenced and fouling of the trays with consequent flooding and frequent interruptions in production does not occur. Also even though the mass transfer plates are not usually as efficient as a packed tower with high efficiency packing, it has been found that the very small amounts of water in the monomer recycle and feed are effectively and efficiently removed down to 10 ppm. Accordingly, in accordance with the present invention, the aforesaid problems are eliminated while still achieving the same water removal at substantially reduced cost.

Evidently, either the polymer contained in the liquid recycle and fresh feed does not come up with the monomer vapor in a mass transfer plate tower, or if it comes up with the vapor, it does not fall out, or if it falls out, it does not adhere to the plate surfaces as it does to the packing surfaces, but rather is carried with the liquid monomer down to the bottom of the tower. Also, it may be that some of the polymer comes up or that there is some fall out but to a lesser extent which does not create the aforesaid problems presented with packed towers.

Preferably, the mass transfer tower is a conventional valve tray tower, which provides a more stable pressure drop over a wider range of pressures than other types of mass transfer plates.

The number of plates depends on the polyolefin plant capacity based on about 15 to 25 plates for 15,000,000 pound polyolefin per year plant capacity.

DESCRIPTION OF THE DRAWINGS

The advantages of the invention will be further understood from the following drawings and detailed descriptions thereof in which drawings

DETAILED DESCRIPTION OF THE INVENTION

Figure 1:
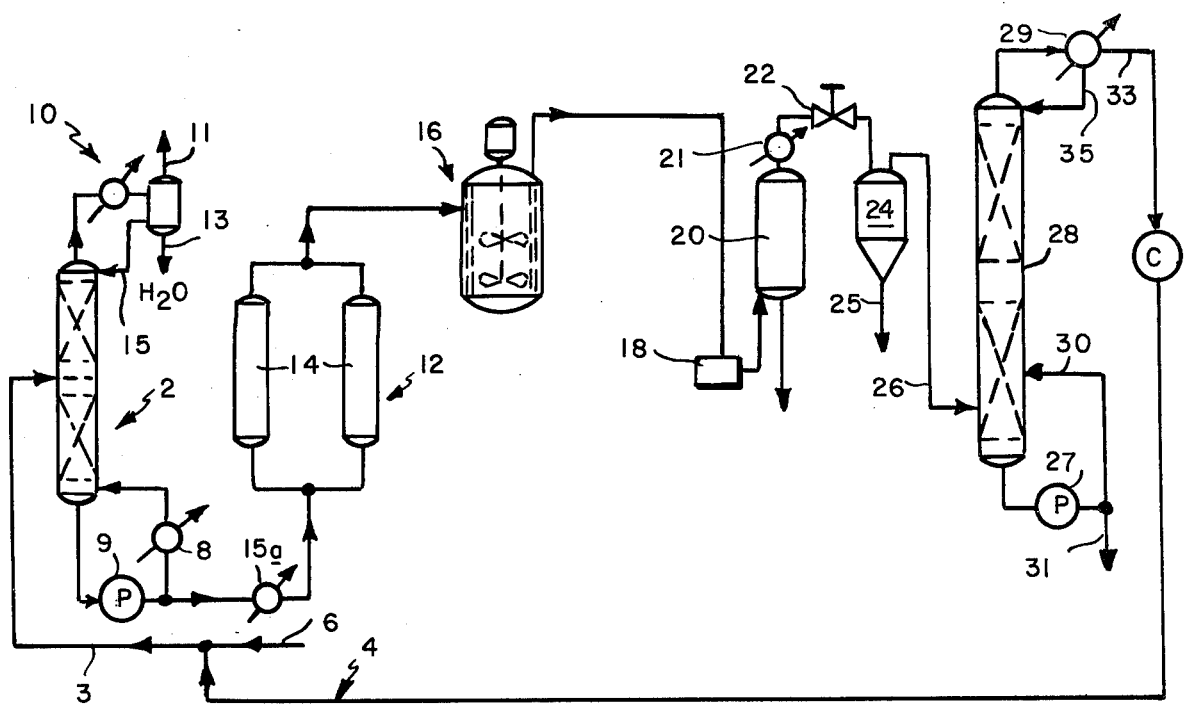
FIG. 1 is a schematic flow sheet of a method embodying the present invention.

With reference to the figures, 2 represents a mass transfer plate stripping tower for stripping water and light ends from the mixture 3 of liquid monomer recycle 4 and fresh liquid monomer feed 6, both of which are under sufficient positive pressure to maintain them in a liquid state. Tower 2 has a conventional reboiler 8 with pump 9 and a conventional reflux condenser and decanter 10 from which the light ends are removed as a vapor at 11, from which condensed olefin monomer is refluxed back to the top of tower 2 via 15 as a lighter liquid fraction and from which the water is removed at 13 as a heavier condensed liquid fraction.

The dried liquid monomer from tower 2 passes through cooler 15a and thence to a conventional molecular sieve dryer 12 having two beds 14, which are cyclically switched by switching valves (not shown) on and off stream. The off-stream bed is regenerated to dry it by heating it and passing a regenerating gas through it while liquid monomer is passing through the on-stream bed.

The dried liquid monomer then flows to the liquid filled reactor 16 where it is admixed with catalyst and hydrogen (to control polymer chain length) while being strongly agitated.

The highly viscous reaction mass, comprising polyolefin dissolved in liquid monomer, passes to mixer 18 where it is mixed with water to kill the catalyst and thereby stop further reaction.

The reaction mass then passes from mixer 18 to a settling tank 20 in which the heavier water, having catalyst dissolved therein, is separated from the reaction mass as a lower layer. The upper layer of reaction mass still made up of olefin polymer dissolved in liquid monomer then passes to a preheater 21 and thence through a flash (reducing) valve 22 over which there is a large pressure drop to flash off the more volatile monomer as a vapor from the polymer into a flash tank 24, from which the polymer is removed at 25 and is extruded, cooled and pelletized and from which the flashed monomer vapor flows via 26 to a quenching tower 28, where oligomers are stripped from the monomer vapor by a reflux stream of liquid oligomers. Vapor from the top of the tower 28 flows to a reflux condenser 29, from which the more volatile monomer vapors exit at 33 and from which the condensed liquid oligomers are refluxed via 35 back to the top of the tower to provide the reflux stream.

Part of the condensed liquid oligomer at the bottom of the tower is recycled back to the quench tower via pump 27 and line 30 and part is removed at 31. The pressure of the monomer vapor 33 is raised by a compressor C to liquify it and the liquid monomer is recycled via line 4. It is believed that small amounts of polyolefin are evidently carried up with the flash vapor 26 probably by entrainment and at least some of it continues to be carried with the vapor through the quenching tower to the recycle line 4 and thence to the stripping column 2.

Figure 2:
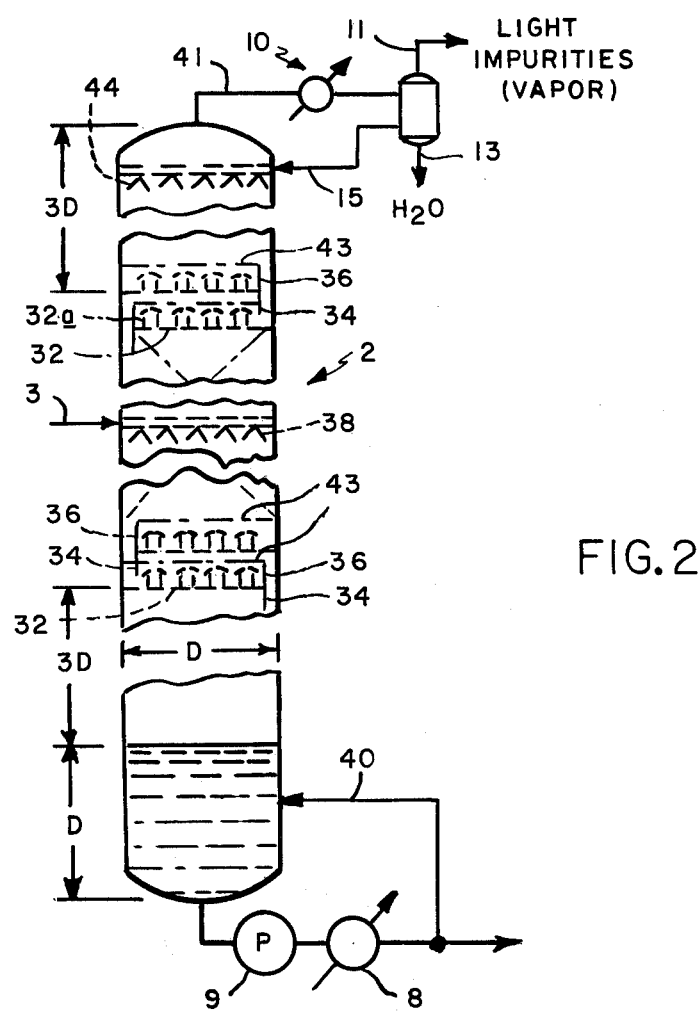
FIG. 2 is a schematic in elevation of the mass transfer tower of FIG. 1.

The mass transfer plate stripping tower 2 (FIG. 2) is a valve tray tower made up of conventional valve trays 32, each of which has a plurality of valve openings 32a, a conventional downcomer 34 and a conventional weir 36. The number of trays depends upon the diameter and height of the tower which depend on the capacity of the plant. Accordingly, the number of plates depends directly on the polyolefin capacity of the plant using as a base from 15 to 25 valve trays for a 15,000,000 lb. polyolefin plant capacity per year.

The mixture of recycle and fresh feed liquid monomer enters tower 2 at 3 and is sprayed by means of a plurality of spray nozzles 38 downwardly with liquid reflux monomer from the top of the tower over the weirs and through the downcomers and along the tops of the trays to the bottom of the tower where it is pumped via pump 9 through a reboiler heater 8 back to the bottom of the tower via 40. The heater 8 heats the liquid monomer to volatilize it upwardly through the valve openings in the valve trays 32 and through the valves 32a and, in the form of bubbles, through the layers 43 of liquid monomer reflux maintained on the tops of the trays and moved along the trays by means of the weirs 36 and downcomer 34.

The monomer vapor from the top of the tower 2 and containing water and light ends passes via 41 to the conventional reflux condenser and decanter 10, from which the light ends leave as a vapor at 11, from which the lighter condensed and decanted liquid monomer fraction is refluxed back to the top of the tower via 15 through spray nozzles 44, and from which the heavier condensed and decanted liquid water fraction is removed at 13.

Although valve trays are preferred, any mass transfer plates can be used, such as bubble cap trays, sieve trays, etc.

EXAMPLE

This example is given for a polypropylene plant having a capacity of 15,000,000 pounds of polypropylene per year.

The temperature, pressure, composition, construction and other properties of the various streams and equipment shown in FIG. 1 are set forth below with reference to the number representing the stream or element of the equipment appearing in FIG. 1.

Stream 6
    Fresh liquid propylene feed at a rate of 1880 lbs./hr. and at 70° F and 600 psig Stream 4
    Recycle liquid propylene recycled as described above at a ratio of recycle to fresh feed of 5 to 10 (7 is preferred) recycle to 1 fresh feed at a temp of 115° F and a pressure of 600 psig and containing less than 50 ppm of polymer Stripper 2
    Conventional valve tray tower
    Liquid propylene monomer — stripping carried out at 170° F and 550 psig. 18 valve trays with 25 valves each — tower diameter (D) of three feet- tower heights of 38 ft. Reduce water content of monomer to 10–20 ppm/

Cooler 15a
    Entry to cooler 170° F and 560 psig
    Exit from cooler 100° F and 550 psig Mol. Sieve Dryer 12
    Entry and exit 100° F — Entry at 550 psig and exit at 540 psig — regeneration of off—stream dryer at 300° F and atmospheric pressure. Reduce water content of monomer to 5–10 ppm.

Catalyst
    Conventional Ziegler catalyst 0.5 to 1 lb. catalyst per 1000 pounds of fresh monomer feed.

Hydrogen
    0.05 to 0.15 lbs per 1000 pounds of fresh monomer feed to control polymer chain length.

Reactor 16
    Reactor temp. 145° F.
    Pressure 450 psig.
    Completely liquid filled.
    Vigorous mixing to ensure good mixing of catalyst and $H_2$ with liquid monomer.
    Reaction mass outlet — polypropylene dissolved in liquid propylene monomer at 145° F and 45 psig.
    Ratio of polymer to liquid monomer — 20%.
    Reaction mass highly viscous.

Mixer 18
    Reaction mass inlet — same as reaction mass outlet of reactor 16.
    Motionless Mixer (high shear intensive mixer) sold under that name by Kenics Incorporated.
    Monel
    Water added at 150° F.
    Exit is 180° F—$\Delta$ T by heat of mixing — and 700 psig.

Settler 20
    Inlet and outlet 180° F and 700 psig Residence time ½–2 hours — polymer in monomer oil phase goes to top — aqueous phase containing catalyst goes to bottom and is removed, neutralized and discarded.

Heat Exchanger 21
 Inlet 180° F and 2500 psig achieved by pump (not shown) between settler 20 and heater 21
 Outlet 380° F and 2000 psig
 Heating fluid — high boiling Dowtherm sold by Dow Corp. at 470°-500° F Flash Valve 22
 Mason Neilan reducing valve — inlet 380° F and 2000 psig — outlet 1500 psig and 300° F flashed monomer vapor contains less volatile oligomers and entrained polymer Flash Drum 24
 Same conditions as exit from 22
 Polymer exits at 25
 Flashed monomer vapor with oligomers and entrained polymer exits at 26

Quenching Tower 28
 Inlet monomer vapor at 300° F and 1500 psig. Liquid oligomer at 31°-60° F at 150 psig and outlet monomer vapor at 33 is 50° F and 150 psig (back pressure valves).

The above description and accompanying drawings of a preferred embodiment of the invention are for purposes of illustration only and it is not intended that the invention be limited thereto or thereby but only to the methods claimed in the appended claims and their equivalents.

It will be understood that with polyolefins other than polypropylene the pressures must be adjusted to make sure that the olefin monomer is maintained in a liquid state.

I claim:

1. In a method of catalytically polymerizing olefins to polyolefins from liquid olefin monomer under positive pressure in which the reaction mass comprises polyolefin dissolved in liquid monomer and in which the liquid monomer is recovered from the reaction mass and is admixed with fresh liquid monomer feed and recycled through the reactor and in which water is stripped from the recycle and fresh monomer feed, the improvement comprising stripping said water from said recycle and fresh feed liquid monomer by passing them through a mass transfer plate tower with reboiler and reflux condenser, removing as a vapor from the condenser light ends, refluxing the lighter condensed liquid monomer fraction back to the top of the column and removing as a second heavier fraction condensed water.

2. In a method of catalytically polymerizing olefins to polyolefins from liquid olefin monomer under positive pressure in which the reaction mass comprises polyolefin dissolved in liquid monomer and in which the liquid monomer is recovered from the reaction mass and is admixed with fresh liquid monomer feed and recycled through the reactor and in which water is stripped from the recycle and fresh feed monomer, the improvement comprising stripping said water from said recycle and fresh feed liquid monomer by passing them into a mass transfer plate tower, raising the temperature of said liquid monomer in said tower by passing the same through a reboiler to volatilize said monomer and water contained therein upwardly through openings in the plates of said tower and as bubbles through layers of liquid monomer maintained and moving along said plates by a plurality of weirs and downcomers by means of which liquid reflux monomer flows downwardly from each plate to the plate below it, along the top of the plate and then downwardly to the next lower plate, condensing the vapor from the top of said tower, removing as a vapor from the condenser light ends, refluxing the lighter condensed liquid monomer fraction back to the top of the column and removing from said condenser as a second heavier fraction condensed water.

3. A method according to claim 2, the number of said plates being sufficient to reduce the water content of said monomer to 10 to 20 ppm.

4. A method according to claim 2, said tower, being a valve tray tower, said plates being valve trays.

5. A method according to claim 3, the number of said trays being between 15 and 25 trays.

* * * * *

UNITED STATES PATENT OFFICE
CERTIFICATE OF CORRECTION

PATENT NO. : 4,068,053
DATED : January 10, 1978
INVENTOR(S) : Constantine D. Miserlis and Peter J. Lewis It is certified that error appears in the above-identified patent and that said Letters Patent are hereby corrected as shown below:

Column 1 line 28 "toward" should be --tower--
Column 1 line 47 "the" should be --and--

Column 2 line 3 "decanter" should be --decanted--

Signed and Sealed this

Fifth Day of September 1978

[SEAL]

Attest:

RUTH C. MASON
Attesting Officer

DONALD W. BANNER
Commissioner of Patents and Trademarks